April 9, 1968
T. G. GRESSETT
3,376,916
ZONE AIR CONDITIONING APPARATUS
Filed Oct. 24, 1965
3 Sheets-Sheet 1
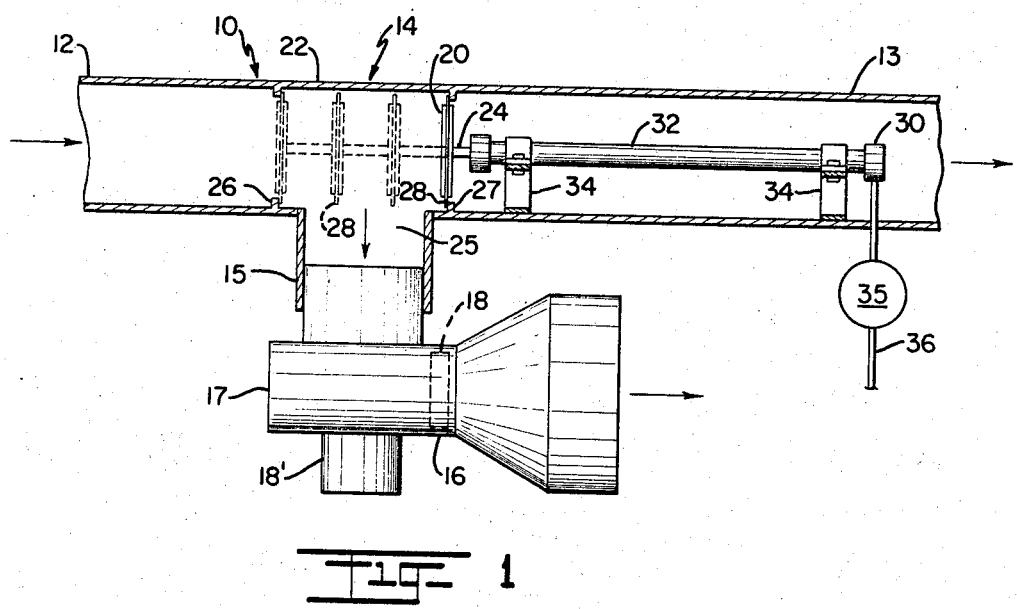
Fig. 1
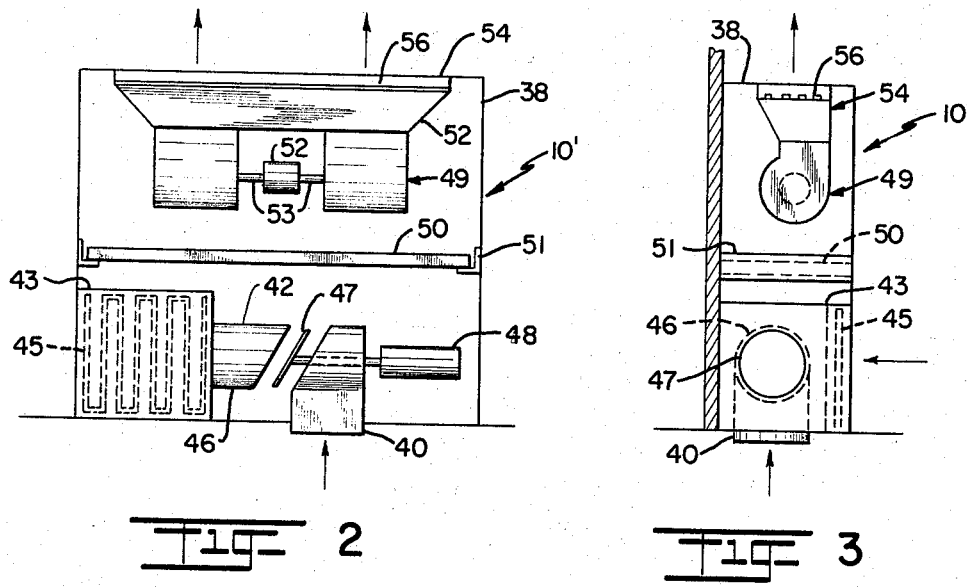
Fig. 2
Fig. 3
INVENTOR.
THOMAS G. GRESSETT
BY
ATTORNEY

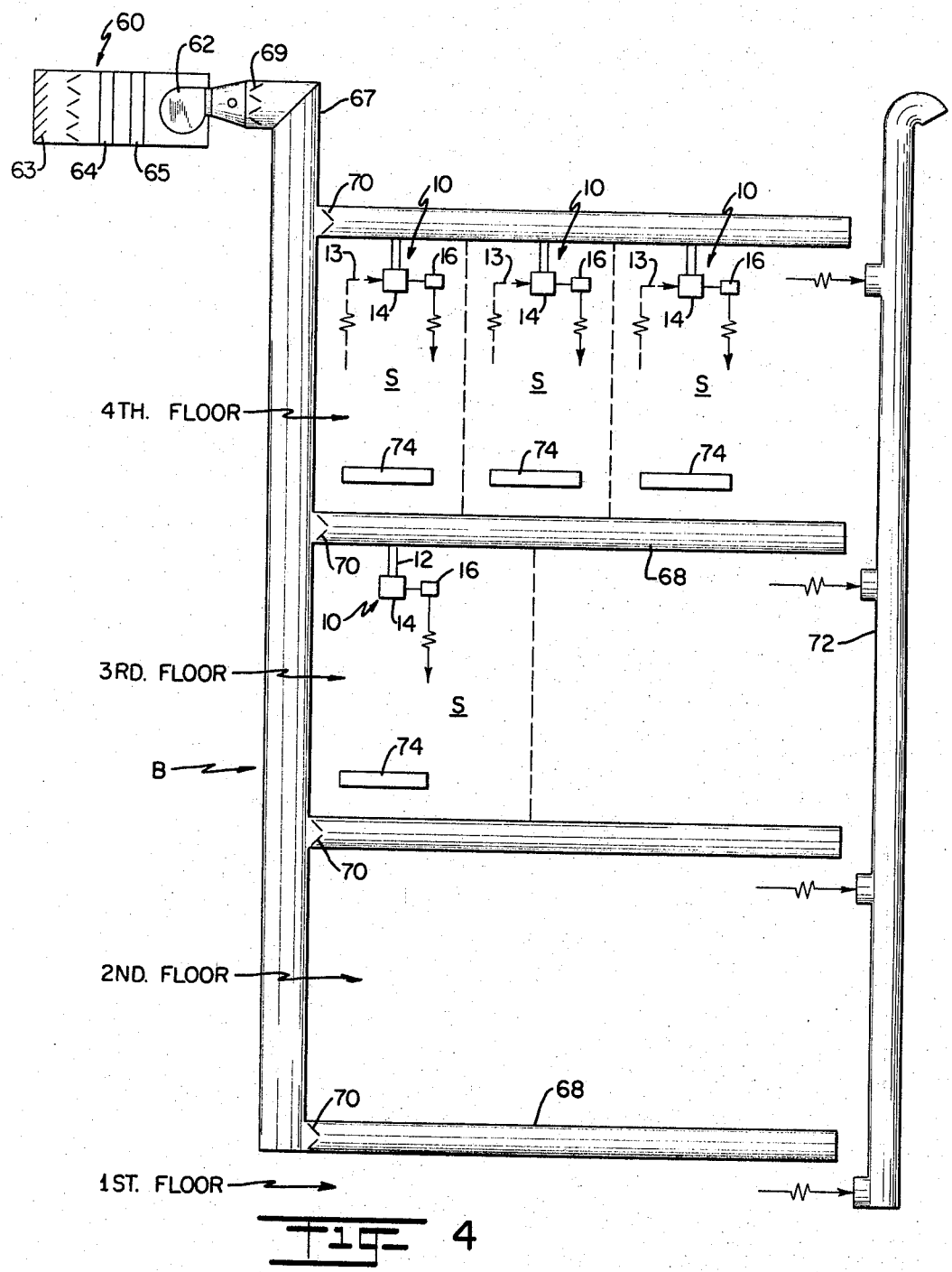

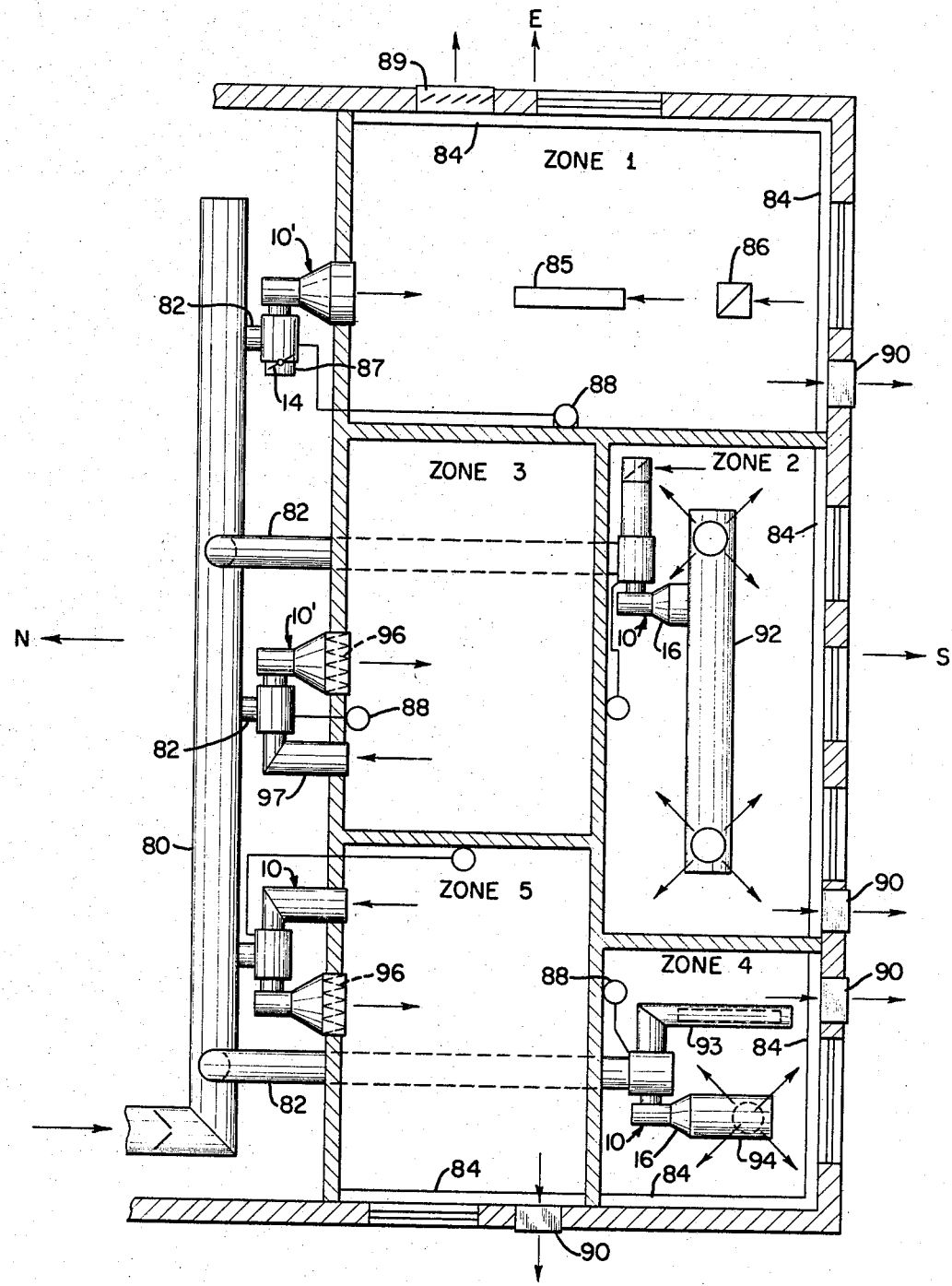

United States Patent Office 3,376,916
Patented Apr. 9, 1968

3,376,916
ZONE AIR CONDITIONING APPARATUS
Thomas G. Gressett, 6154 Windermere Circle,
Littleton, Colo. 80120
Filed Oct. 24, 1965, Ser. No. 504,379
10 Claims. (Cl. 165—22)

This invention relates to novel and improved heating, ventilating the air conditioning systems, and more particularly relates to a novel and improved method and means for mixing and regulating the supply of air to a room or space in a highly simplified, efficient manner.

It is generally known to regulate the quality and temperature of air supplied to a space or zone by the controlled mixture of warm and cold air sources. One problem inherent in such systems presently in use is the size and amount of equipment and expense required to properly maintain and operate the systems, particularly in multiple zone buildings. Moreover, it is difficult to establish close control over the volume and temperature of air flow at the point of delivery into each space or zone, for instance, to maintain a constant volume of air flow into the space and to make maximum utilization of the warm return air from the space; and in the past, systems utilizing warm air from the space have not been considered to be useful in actual practice, especially in larger or commercial installations since they are not readily adapted for use under different weather conditions or types of applications; nor are they capable of accurately controlling the relative amount of cool primary air and warm or return air over the full range between 100% cool air and 100% warm air.

Accordingly, it is an object of the present invention to provide for a novel and improved air conditioning system which is specifically characterized by having a simplified, efficient means of controlling the capacity, or volume rate of flow, temperature of air supplied to one or more spaces or zones and wherein such means requires a minimum number of parts while being highly versatile, compact and easily installed and maintained.

It is another object of the present invention to provide for an improved air conditioning control system which is capable of establishing constant volume delivery of air at a predetermined but selectively variable temperature level and where the volume or capacity of air flow may be closely regulated according to the demands of each zone and space, and the control system being further characterized by making maximum utilization of existing heat sources in the space and, for example, is capable of deriving its source of heat through the novel combination of return air flow from the space for mixing and recycling with a primary air source.

It is a further object of the present invention to provide for a control unit for an air conditioning system which is conformable for use in different applications with minimum modification or change required and where the control unit is adaptable for use either with or without auxiliary means of heating and wherein several such units may be employed in combination for conditioning the air into different zones or spaces having different heating and cooling load requirements; moreover, wherein each control unit is operated off a common temperature, central air is capable of accurately controlling relative amounts of cold and warm air to each zone independently over the full range from 100% cold air to 100% warm air.

Another object is to provide an air conditioning system incorporating one or more control units in accordance with the present invention in a unique and highly effective manner and wherein such air conditioning system is particularly useful in multiple zone applications where, according to the requirements of each zone, each control unit may incorporate or make use of one or more heat sources, such as, for example, hot water, steam or electrical heating either along or in combination, or may simply rely on return air as a warm air source for mixing and combination with the primary source of air for delivery into each zone or space.

It is a still further object of the present invention to provide for a novel and improved heating, ventilating and air conditioning system for servicing different zones of a building with variable heating and cooling load requirements and wherein the system requires a single primary source of cold air in combination with a conventional source of warm air provided to separately supply heat to each zone or where the warm air source is individually selected for each zone for use in combination with the primary air source to regulate the temperature and treatment of air for each zone or space.

The above and other objects, advantages and features of the present invention will become more readily appreciated and understood from a consideration of the following detailed description of preferred and alternate forms of the present invention when taken together with accompanying drawings in which:

FIGURE 1 is a view, partially in section, of a preferred form of control unit in accordance with the present invention.

FIGURE 2 is a shomewhat schematic view, partially in section, of a modified form of control unit.

FIGURE 3 is a side view of the modified form of control unit illustrated in FIGURE 2.

FIGURE 4 is a schematic representation of a heating, ventilating and air conditioning system illustrating the cooperative disposition and relation between one or more control units and a primary air source; and FIGURE 5 is a schematic representation of a heating, ventilating and air conditioning system incorporating a plurality of control units illustrated in FIGURES 1-3 for servicing multiple zones of a building.

Referring in detail to the drawings, FIGURES 1-3 generally illustrate preferred and modified forms of control units for use in combined heating, ventilating and air conditioning systems. Essentially, the basic function of the units to be described is to induce the flow of air from a primary or cold air source and from a warm air source in proper proportions through a mixing device and thereafter discharge the air so combined by means of a fan or blower located at the outlet or discharge side of the mixing device for delivery at a constant volume into the space. In FIGURE 1, there is illustrated a control unit 10 which is adapted for installation in the ceiling of a room or space and has a cold air inlet duct 12 communicating with a primary or cold air source, a warm air inlet duct 13 communicating with a warm air source and where the inlet ducts lead into a common enclosure or control box 14 which serves as the mixing device for the unit. The control box 14 is therefore located between the warm and cold air inlet ducts and in turn has a common outlet duct 15 leading into a discharge duct 16 including a housing 17 for a fan or blower represented at 18. The fan or blower may be of any conventional form and is positioned to force air into the space by drawing the air through the control box 14 from the cold and warm air inlet ducts 12 and 13 and where the proportionate amount of cold and warm air is selectively controlled by the mixing device 14.

In the preferred form, the mixing device 14 is defined by a baffle plate 20 which is generally circular to conform in size and configuration with the internal wall surface of the generally T-shaped enclosure section 22 which serves to join the inlet ducts 12 and 13 in coaxial relation. The baffle plate is mounted for axial travel through the enclosure 22 on a control rod 24 so as to traverse the entrance 25 opening into the common outlet duct 15. As illustrated, the end limits of travel for the baffle plate 20 are between inwardly projecting collars 26 and 27 on opposite sides of the entrance 25 and the baffle plate has an outer peripheral seal 28 to establish sealed relation at opposite end limits of travel with either one of the collars 26 or 27. In FIGURE 1, the damper or baffle plate 20 is illustrated in full in its closed position across the warm air duct 13 so that the discharge fan 18 will draw nothing but cold or primary air through the duct 12 for discharge into the space. However, as the baffle plate is advanced forwardly toward the opposite end limit of travel against the collar 26, as shown in dotted form, it will gradually admit increasing amounts of warm air while at the same time reducing the amount of cold air flow, until at its opposite extreme limit of travel it will admit only warm air for discharge through the discharge duct 16. Thus assuming that equal amounts or volumes of warm air and cold are available for distribution, when the baffle plate 20 is at its mid-point of travel across the opening 28 is would permit mixing of equal amounts of air supplied through the cold and warm air ducts 12 and 13.

It will be evident that various means can be provided for controlling the movement of the baffle plate 20 across the opening 28; in the preferred form, it is accomplished by means of a damper motor 30 for driving suitable gearing, not shown, mounted in sleeve 32 for engagement with the control rod 24, and the sleeve 32 being supported in the warm air duct on blocks 34. The damper control motor 30 is reversible and is thermostatically controlled in direction and extent of rotation for advancement of a control rod by means of a thermo valve 35 positioned in line 36, the latter being in communication with the space or zone to be treated. Thus, the motor drive is operated according to the setting of the valve in response to the temperature in the space whereby to determine the position of the baffle plate across the opening 28 and in this way to modify or regulate the temperature of the air circulated by the discharge fan in accordance with the requirements of that space. Here it is important to note that by placing the discharge fan on the downstream or outlet side of the damper control, and by running the discharge fan at a constant speed, it will deliver a constant volume of air into the space even though the volume of air supplied through the respective inlet ducts is variable. In this relation, a variable speed motor 18' may be utilized to drive the fan at a selected speed setting, and once the speed setting is determined for a given desired volume and flow rate of air into the space, the discharge fan will maintain a constant volume of air flow independently of the volume of air utilized from the primary source. In this relation, the primary source may be defined by a central air distribution or handling system; whereas the warm air source may simply be constituted of return air from the zone or space being treated, the space itself may have a conventional heating system, or the control unit itself may incorporate auxiliary heating elements to raise the temperature of the air to the required level to satisfy the room temperature needs.

In FIGURES 2 and 3, there is illustrated a modified form of control unit 10' which is adapted for installation on a wall surface, and specifically is illustrated as having an outer common enclosure 38 resting on the floor and against one wall surface of a zone or space. A downwardly directed cold air inlet duct 40 extends through the bottom of the enclosure 38 and through the floor, and a return air inlet duct 42 extends horizontally at right angles to the duct 40 to receive air from the room through a grill or register 43 in one side of the enclosure; also a heating coil represented at 45 is positioned within the register 43 to heat the return air from the space prior to its passage through a damper control box 46. The damper control box 46 operates and functions in much the same manner as the damper control 14 of the preferred form of invention and includes a baffle plate represented at 47, at the intersection of the ducts 40 and 42, which is advanced by means of a thermostatically controlled damper motor represented at 48 to regulate the proportionate amounts of cold air and warm air being drawn through the damper control box under the influence of an upper discharge fan assembly 49. It will be seen that the air is induced to flow upwardly through filter 50 positioned on a rack 51 and through the upper discharge area or zone defined by the enclosure 38 for delivery into the space and that the fan is located, again, on the discharge or downstream side of the mixing device. For the purpose of illustration, the fan assembly 49 may consist of a double fan arrangement having a common variable speed motor 52 and drive shaft 53 for the purpose of discharging increased volumes of air and diffusing same through the discharge register 54 over a relatively wide area.

An optional feature for use in the wall-mounted control unit 10' is a heating coil 56 located adjacent to the discharge register 54 within the enclosure 38. Moreover, in place of a single baffle plate between the cold and warm air inlet ducts 40 and 42 is may be desirable to employ separate volume control dampers for each of the inlet ducts correlated in opening and closing by a thermostatically controlled mechanism in order to proportion the relative amounts of warm and cold air discharged to the space.

In general, referring to the preferred and modified forms of invention illustrated in FIGURES 1–3, selection of duct sizes will be a function of the air volume required or in other words the volume demands of the space and of the capacity of the primary or cold air source. For the purpose of the present invention and as expressed herein, "warm air temperature" or "warm air source" is any temperature or source equal to or higher than room temperature; whereas "cold air temperature" or "cold air source" refers to a temperature that is less than room temperature, room temperature being that temperature desired by the occupant of the room to be comfortable. In most all cases room temperature will never be less than 67° F. or higher than 80° F. As a result, where several different zones are being serviced in a single building, most desirably the cold air source will be at a temperature substantially less than 67° and usually on the order of 50° F.; and in each zone selection of the warm air source, if necessary, will be dictated by the maximum amount of heat necessary to satisfy room temperature in relation to the minimum amount of primary air necessary to satisfy ventilation requirements of the space. Of course a number of variables are present which constantly affect the heating, cooling and ventilating requirements of each space, such as, solar heating, weather changes, body heat and heat energy of the lights. The important features of the present invention resides in the ability of the control units to closely regulate the quality of the air to a space, notwithstanding wide variations in the heating, cooling and ventilating requirements of the space, and to accomplish this in a highly simplified but efficient and dependable manner. Thus, one source of primary or cold air is required and a control unit for each zone or space is capable of modifying the primary air to whatever is dictated by the loading requirements of that space; and a series of control units can efficiently operate from a single source of primary cooling air where each unit may or may not have an independent source of warm air depending upon the load requirements in that zone. For example, in mild weather climates or interior zones of a building the control unit may effectively utilize the return air from the space with little or nothing in the way of supplementary heating means; however, in cold weather climates and along external zones of a building the control units may derive heat either from a conventional heating system installed in the space, by "heat of the lights" or heating coils incorporated in the unit; yet in each case the control unit will efficiently control both the volume and temperature of air to satisfy the requirements of that space independently of the other zones and spaces from a single source of common temperature cooling air.

FIGURE 4 is illustrative of a typical application of a series of control units 10 in a commercial installation, represented by a building B, and wherein a control unit 10 is placed in each zone or room S. A common air distribution unit 60 is employed which may suitably consist of a fan or blower 62, an outside air intake louvre 63 with a preheat coil 64 and a cooling coil 65 stationed between the intake 63 and fan 62. In a conventional manner, the fan 62 directs the air from the intake through a main duct 67 traversing each floor of the building, and branch takeoff ducts 68 distribute the air from the common duct 67 according to the demand of the zone or spaces on each floor. Preferably the volume of air available is controlled by a main volume control damper 69 located at the junction between each of the branch takeoff ducts 68 and the common duct 67. In turn, excess air is removed from each space through pressure relief openings, not shown, but which communicate with a pressure relief duct represented at 72 to convey air to the outside.

In colder climates, most desirably a separate source of heat is provided for the building and here is represented by a perimeter heating system including baseboard heat registers represented at 74 for each space. As a matter of design, with some consideration given to the requirements and size of the space, each control unit may either be a ceiling mounted installation 10, as illustrated at FIGURE 1, or, a wall-mounted installation 10' illustrated in FIGURES 2 and 3. Again, for the purpose of illustration, ceiling mounted units 10 are shown and in operation will draw primary cooling air from a branch takeoff 68 through to the inlet duct 12, and further will draw warm or return air from the space through the warm air inlet duct 13 for mixing within control box 14, and discharge by fan 16 into the space. Close accurate control is established in each space since according to the temperature of the air in the room, the damper control 14 will establish the proper ratio between primary and return air necessary to raise or lower the temperature in the room as desired. As a consequence, each room or space is controlled independently of the others yet requires one primary source of air and one warm air source. In operation, the central fan 62 will run continuously and the volume control dampers 69 and 70 will be set as required to maintain static pressure in the main duct 67 and branch takeoff ducts 68. Depending upon the outside air temperature, the heating coil 64 and cooling coil 65 may be modulated to maintain a predetermined primary air temperature, such as, 50° F. In extreme cold weather conditions, the supply air temperature could be heated somewhat above 50° F. but never to exceed room temperature. Where outside air temperature ranges from 50 to 60° F. both the heating and cooling coils 63 and 64 would be inactive, and above 60° the cooling coil may be energized to maintain 50° supply air temperature.

It will be evident that in milder climates a separate heating system may not be required. If necessary at all, heating coils may be incorporated as optional features in the control units or the light fixtures may be employed as a source of heating the return air to the control units for recycling into the room. An important use of optional heating coils in the control units is automatically to energize the coils in response to closing the primary air duct or substantial reduction in the supply of fresh or cooling primary air, for example, in the event of a sudden drop in room temperature. In this way, minimum volume requirements of fresh air are provided notwithstanding variations in temperature in the room. Moreover, the pressure relief duct 72 may be connected as a source of return air to the central air distribution system for the purpose of warming or preheating the primary air circulated by the central system.

FIGURE 5 is a typical floor plan of a multiple zone building in which five different zones are illustrated, each having different heating and cooling load requirements. For example, zone 1 has a southeastern exposure, zone 2 has a southern exposure, zone 3 is an interior zone, zone 4 has a southwestern exposure and zone 5 is an interior zone but having a limited western exposure. In accordance with the present invention, each zone can be separately controlled and regulated by utilizing one primary cool air source, and a separate source of warm air being selected for each zone according to its requirements. Thus, a central air distribution system, not shown, supplies cool air to a branch duct 80 with auxiliary ducts 82 serving as primary cool air inlet ducts into the control units of each zone. For example, zone 1 has a wall-mounted unit 10' receiving primary cool air from the auxiliary duct 82. To provide a source of heat for the air in the zone 1, perimeter heating units 84 are located at spaced intervals around the external wall, and "heat of light" is employed by locating one return air opening 85 in association with the ceiling light fixture and which together with another return air opening 86 communicates with a common warm air inlet 87. A suitable electrical or pneumatic thermostat 88 is represented in the space to govern the damper control setting, and air relief openings 89 and 90 are illustrated in the external wall for removing excess air from the zone and maintaining balanced air circulation.

In zone 2 on the south side of the building, a ceiling mounted unit 10 is used and due to the narrow elongated configuration of the space is provided with a supply diffuser 92 for more uniform distribution of the air from the discharge duct 16 to the space. Perimeter heating units 84 are again positioned along the external wall surface but since the cooling load requirements may not be expected to be as great, optional heating coils are not provided on the control unit. Similarly, in zone 4, a ceiling mounted unit 10 is again provided with a "heat of light" return duct 93 and the air from the discharge duct 16 again is circulated through a diffuser 94.

Zone 3 is an interior zone and is provided with a wall mounted control unit 10' which in the absence of a perimeter heating system employs an optional heating coil represented at 96, and return air is circulated from the room directly through a return air duct 97 which may or may not be provided with another auxiliary heating coil. Similarly, zone 5 is for the most part an interior zone but with some limited outside exposure. Accordingly, a perimeter heating unit 84 supplies a portion of the heat requirements and in addition an optional heating coil 96 may be used in association with the discharge duct to heat the air as it is supplied to the space. In the control units 10 and 10' for the various zones, separate damper plates 14' are represented in place of a common baffle plate to regulate the proportionate amount of air delivered by the primary and warm air ducts according to the thermostatic setting; however, the common baffle plate construction affords more simplified direct control through a single damper control motor for proper mixing of the primary and warm air.

The foregoing is merely intended to illustrate some of the various air distribution methods of application of the control unit to a particular structure and where variations may be resorted to according to the load requirements of each space while nevertheless relying on a single common temperature primary cool air source. A separate warm air source may take the place of return air from the space for example where in a given application it is desirable to employ a forced air heating system. In most instances, however, it is much more practical and economical to employ a conventional heating system in the space if required and to utilize the return air from the space to heat the primary air by drawing it through a mixing device and discharging by a fan located downstream of the mixing device in all cases. In each case, there is provided a warm air source and a cold air source intermixed by a mixing device which is set according to room temperature, and in cooperation with a fan or blower located downstream of the mixing device which will supply mixed air at the desired temperature level and at a constant air volume to the space. An added feature of providing a discharge fan in each space located downstream of the mixing device is that it can be preset to deliver the optimum volume of air into the space and which will remain constant notwithstanding variations in the proportionate amounts of cold and warm air being circulated. On advantage of employing a heating coil as an optional part of the control unit is that it affords a more direct means of control over the temperature of the return air being mixed with the primary air at a predetermined temperature setting. Thus as a source of warm or return air, heat of lights may be utilized as the sole source of heat or as an auxiliary source of heat; or an additional heating coil can be added to the control unit at the discharge duct or at the warm air inlet duct to provide a source of heat; or a separate heating system in the space may be employed. It will be evident here that any of the three alternate forms of heating may be used as a heat source, or any combination of the three may be used, as a result of the manner in which the discharge fan is positioned downstream of the mixing device for the purpose of drawing or inducing the flow of mixed amounts of cool primary air and warm air therethrough, and since the mixing device is capable of controlling relative amounts of the air supplied ranging from 100% cool air to 100% warm or return air.

While there has been shown and described preferred and modified forms of the present invention as well as adaptations thereof to different uses, it is to be understood that various modifications and changes may be resorted to without departing from the spirit and scope of the present invention as defined by the appended claims.

What is claimed is:

1. In an air conditioning system including a cooled air source and cooled air distributing means to distribute the cooled air to a plurality of zones, a control unit for each zone comprising a cooled air inlet duct, a return air inlet duct communicating with the zone, a common discharge duct communicating with each of said inlet ducts having a common entrance communicating with said cooled air and return air inlet ducts and including blower means to induce the flow of cooled air and return air through said inlet ducts for discharge in mixed quantities into the zone, means for sensing the temperature level in each zone, and a common damper control member between said inlet ducts and said blower means being defined by a baffle plate movable across the entrance to said discharge duct to adjustably control the relative amounts of cooled air and return air being discharged by said blower into the zone according to the temperature level in that zone while maintaining a constant volume of air flow from said inlet ducts through said discharge duct independently of variations in the relative amounts of cooled air and return air supplied.

2. In an air conditioning system according to claim 1, in which each zone includes a heating unit for heating the air discharged into the zone by each blower.

3. In an air conditioning system according to claim 1 wherein said control unit for each zone includes heating element therein for heating the return air from the zone prior to mixing and discharge by said blower.

4. In an air conditioning system according to claim 1, in which said control unit includes a heating element disposed in said discharge duct to heat the mixed air induced to flow through said inlet ducts prior to discharge into the zone.

5. In an air conditioning system according to claim 4, said heating element being energized to heat the air in response to a temperature reduction in the space causing said damper control means to substantially close said cooled air inlet duct.

6. Air conditioning apparatus for a multiple zone building in which each zone is subject to variable heating and cooling load requirements, said apparatus comprising a central cold air source having common, cold air delivery means for distributing cold air from said source to each of the zones, air distribution control means for each zone including a cold air inlet communicating with said cold air delivery means and a return air inlet communicating with each zone, said air distribution control means further including air discharge means to induce the flow of air through said inlets from a point downstream of said inlets for discharge at a constant volume into the zone, and temperature-responsive damper control means between said inlets and said discharge means for controlling the proportionate flow capacity of cold air and return air discharged into the zone in accordance with the temperature level in the zone primary heating means located in each zone for heating the air in each zone, thermostat means for said damper control means to sense the air temperature at a selected point in each zone, and secondary heating means associated with said air discharge means being selectively energized to heat the air being discharged into the zone when the temperature in the zone is reduced to a predetermined temperature below the setting of said thermostat control means.

7. Air conditioning apparatus according to claim 6, in which each zone is provided with light fixtures, and said return air inlet communicating with each zone at a point adjacent to a light fixture for heating the return air by the heat of the lights as the air is induced to flow into the return air inlet.

8. Air conditioning apparatus according to claim 6 in which said cold air source includes preheating means and cooling means being selectively energized to maintain the temperature of the cold air at a predetermined level in accordance with variations in the temperature of the outside air.

9. In an air conditioning system including a cooled air source and cooled air distributing means to distribute the cooled air to a plurality of zones a control unit for each zone comprising a generally T-shaped duct defining a pair of coaxial, aligned inlet ducts communicating with a common outlet duct normal to said inlet ducts, a common damper control member being defined by a baffle plate movable axially of said inlet ducts across the entrance to said outlet duct between a first position closing one of said inlet ducts and a second position closing the other of said inlet ducts, means to sense the temperature level in each zone, and thermostatically controlled drive means being responsive to the temperature level sensed in each zone to adjustably control movement of said baffle plate between said inlet ducts whereby to adjustably control the relative amounts of cooled air and return air being discharged by said blower into the zone according to the temperature level sensed in that zone while maintaining a constant volume of air flow from said inlet ducts through said outlet duct independently of variations in the relative amounts of cooled air and warm air supplied.

10. In an air conditioning system having a central cold air source provided with common, cold air delivery means for distributing cold air from said source to each of a plurality of zones in a multiple zone building in which each zone is subject to variable heating and cooling load requirements, the combination therewith of air distribution control means for each zone comprising a cold air inlet communicating with said common cold air delivery means and a return air inlet communicating with each zone, air discharge means to induce the flow of air through said cold air and return air inlets from a point downstream of said inlets for discharge at a constant volume into the zone, means for sensing the temperature level in each zone, and temperature-responsive damper control means between said inlets and said discharge means for controlling the proportionate flow capacity of cold air and return air discharged into the zone in response to the temperature level sensed in that zone.

References Cited

UNITED STATES PATENTS

| | | | |
|---|---|---|---|
| 2,104,088 | 1/1938 | Lyman | 98—38 |
| 2,109,512 | 3/1938 | Stacey | 98—38 X |
| 2,157,307 | 5/1939 | Savage | 98—38 X |
| 2,284,764 | 6/1942 | Parks | 236—13 X |
| 2,345,277 | 3/1944 | McGrath | 165—22 X |
| 2,781,714 | 2/1957 | Labus | 98—38 |
| 3,187,806 | 6/1965 | Kreuttner et al. | 165—22 |
| 3,212,424 | 5/1965 | Davis | 98—38 |
| 3,272,427 | 9/1966 | Valentine | 98—38 X |

FOREIGN PATENTS 754,790  8/1956  Great Britain.

ROBERT A. O'LEARY, *Primary Examiner.*

M. A. ANTONAKAS, *Assistant Examiner.*